US012576496B2

(12) United States Patent
Carter et al.

(10) Patent No.: US 12,576,496 B2
(45) Date of Patent: Mar. 17, 2026

(54) UNIVERSAL CHISEL ATTACHMENT

(71) Applicants: Adam Douglas Carter, Henderson, NV (US); Dave Hawks, Henderson, NV (US)

(72) Inventors: Adam Douglas Carter, Henderson, NV (US); Dave Hawks, Henderson, NV (US)

( * ) Notice: Subject to any disclaimer, the term of this patent is extended or adjusted under 35 U.S.C. 154(b) by 0 days.

(21) Appl. No.: 18/448,009

(22) Filed: Aug. 10, 2023

(65) Prior Publication Data

US 2023/0390911 A1 Dec. 7, 2023

Related U.S. Application Data

(63) Continuation-in-part of application No. 17/086,142, filed on Oct. 30, 2020, now abandoned.

(60) Provisional application No. 62/928,979, filed on Oct. 31, 2019.

(51) Int. Cl.

| | |
|---|---|
| ***B25D 17/00*** | (2006.01) |
| ***B25D 17/02*** | (2006.01) |
| ***B25F 3/00*** | (2006.01) |

(52) U.S. Cl.

CPC ........... *B25D 17/005* (2013.01); *B25D 17/02* (2013.01); *B25F 3/00* (2013.01); *B25D 2250/045* (2013.01); *B25D 2250/111* (2013.01)

(58) Field of Classification Search

CPC ......... B25F 3/00; B25D 17/005; B25D 17/02; B25D 17/04; B25D 2250/045; B25D 2250/111

USPC .......................................................... 173/132

See application file for complete search history.

(56) References Cited

U.S. PATENT DOCUMENTS

| | | | | |
|---|---|---|---|---|
| 323,053 A * | 7/1885 | McCoy | E02D 7/10 | 173/132 |
| 2,211,741 A * | 8/1940 | Elwell | F16H 23/10 | 173/205 |
| 2,227,627 A * | 1/1941 | Bruzon | B25B 23/141 | 173/93.6 |

(Continued)

FOREIGN PATENT DOCUMENTS

| | | |
|---|---|---|
| CN | 2671742 Y | 1/2005 |
| JP | 3023692 U | 4/1996 |

*Primary Examiner* — Anna K Kinsaul
*Assistant Examiner* — Mobeen Ahmed
(74) *Attorney, Agent, or Firm* — Heidi Eisenhut; LOZA & LOZA, LLP

(57) ABSTRACT

A universal chisel attachment is an apparatus designed to convert the torque generated by an electric tool into a reciprocal linear motion to drive a chisel member. The apparatus includes a socket adapter, a chisel assembly, a hammering cam mechanism, and a tubular housing. The socket adapter enables the rotational connection of the hammering cam mechanism to a mounting mechanism of the electric tool. The socket adapter also enables the apparatus to be secured to the electric tool. The hammering cam mechanism converts the torque generated by the electric tool to a reciprocal linear motion of the chisel assembly. The chisel assembly enables the carving or cutting of the target object with the apparatus. The tubular housing enables the unobstructed operation of the hammering cam mechanism during operation. The tubular housing also safely retains all the moving components of the hammering cam mechanism to protect the user during operation.

18 Claims, 19 Drawing Sheets

(56) References Cited

U.S. PATENT DOCUMENTS

| | | | | | |
|---|---|---|---|---|---|
| 2,436,692 | A * | 2/1948 | Greene | B23D 49/162 | 144/35.2 |
| 2,567,856 | A * | 9/1951 | Polk | B23D 57/0076 | 408/20 |
| 2,724,573 | A * | 11/1955 | Lundquist | B25D 17/005 | 173/205 |
| 3,100,650 | A * | 8/1963 | Bell | B25D 17/005 | 279/19 |
| 3,101,006 | A * | 8/1963 | Kurt | E21B 19/24 | 173/160 |
| 3,268,014 | A * | 8/1966 | Drew | B25D 11/102 | 173/203 |
| 3,341,213 | A * | 9/1967 | Lang | B25D 17/005 | 173/133 |
| 3,398,588 | A | 8/1968 | Meier | | |
| 3,491,839 | A * | 1/1970 | Mcintire | F16D 43/206 | 464/36 |
| 3,511,323 | A * | 5/1970 | Riley, Jr. | G10K 11/004 | 126/41 R |
| 3,803,667 | A * | 4/1974 | Rose | A61B 17/1604 | 81/439 |
| 3,965,510 | A * | 6/1976 | Ernst | B25B 21/007 | 7/165 |
| 4,111,060 | A * | 9/1978 | Nerini | B25D 11/106 | 144/48.5 |
| 4,280,373 | A * | 7/1981 | Denkowski | F16K 31/00 | 74/625 |
| 4,298,074 | A * | 11/1981 | Mattchen | A61B 17/1624 | 606/104 |
| 4,304,047 | A * | 12/1981 | Jesionowski | B25D 11/108 | 30/500 |
| 4,450,919 | A * | 5/1984 | Cousineau | B25D 17/005 | 173/29 |
| 4,790,045 | A * | 12/1988 | Doherty | A47L 13/08 | 15/93.1 |
| 5,607,265 | A * | 3/1997 | Lane | B23D 57/0076 | 144/48.6 |
| 5,820,312 | A * | 10/1998 | Stock | B25D 17/005 | 173/205 |
| 5,966,818 | A * | 10/1999 | Spirer | B25D 3/00 | 30/340 |
| 5,992,538 | A * | 11/1999 | Marcengill | B25D 11/102 | 173/171 |
| 6,202,760 | B1 * | 3/2001 | Lin | B24B 23/022 | 173/132 |
| 6,751,875 | B2 * | 6/2004 | Jones | B26D 5/16 | 606/85 |
| 7,096,972 | B2 * | 8/2006 | Orozco, Jr. | B25D 17/005 | 173/132 |
| 9,995,377 | B2 * | 6/2018 | Palmieri | A46B 13/02 | |
| 2004/0011542 | A1 * | 1/2004 | Comarmond | B25D 17/082 | 173/132 |
| 2004/0050568 | A1 * | 3/2004 | Orozco, Jr. | B25D 11/102 | 173/100 |
| 2005/0126359 | A1 * | 6/2005 | Ogston | B25D 17/02 | 156/763 |
| 2005/0199117 | A1 * | 9/2005 | Quinn | B23D 51/10 | 83/698.11 |
| 2005/0251146 | A1 * | 11/2005 | Martz | A61B 17/1604 | 606/84 |
| 2006/0086210 | A1 * | 4/2006 | Kingham | E04D 15/003 | 81/45 |
| 2006/0131041 | A1 * | 6/2006 | Hsieh | B25D 17/005 | 173/104 |
| 2008/0245541 | A1 * | 10/2008 | Grunig | B25D 9/02 | 173/17 |
| 2010/0300719 | A1 * | 12/2010 | Fisher | B63B 59/08 | 173/205 |
| 2011/0127054 | A1 * | 6/2011 | Chen | B23B 31/1071 | 279/143 |
| 2012/0152577 | A1 * | 6/2012 | Mattson | B25D 16/00 | 81/436 |
| 2013/0105542 | A1 * | 5/2013 | Richardson | B21J 15/105 | 227/51 |
| 2017/0197305 | A1 * | 7/2017 | Rastegar | B25F 3/00 | |
| 2018/0043520 | A1 * | 2/2018 | Aho | B25D 17/08 | |
| 2020/0001445 | A1 * | 1/2020 | Mcarthur | B25D 17/02 | |
| 2020/0230795 | A1 * | 7/2020 | Carlson | B25C 1/047 | |
| 2020/0254596 | A1 * | 8/2020 | Sawa | B25D 17/005 | |
| 2021/0023630 | A1 * | 1/2021 | Davis | B23B 51/12 | |
| 2022/0324035 | A1 * | 10/2022 | DuMez | B25D 17/005 | |

* cited by examiner

UNIVERSAL CHISEL ATTACHMENT

The current application is a continuation-in-part (CIP) application of a U.S. non-provisional application Ser. No. 17/086,142 filed on Oct. 30, 2020. The U.S. non-provisional application Ser. No. 17/086,142 claims a priority to a U.S. provisional application Ser. No. 62/928,979 filed Oct. 31, 2019.

FIELD OF THE INVENTION

The present invention generally relates to power tools and tool accessories. More specifically, the present invention provides a universal chisel attachment for a drill or an impact tool.

BACKGROUND OF THE INVENTION

Electric tools have become an integral part of several industries, such as the construction industry. Electric tools greatly increase the work efficiency by allowing users to perform the work more effectively without exerting greater physical effort. Some of the most common electric tools utilized today are cordless electric tools, such as cordless drills and impact tools. Cordless electric tools are often designed to accommodate several accessories that allow the user to perform different tasks. For example, chisel bits have been made available for impact tools that enable the user to more efficiently cut or carve hard materials. While useful, these chisel bits can only be used effectively with impact tools, not with other electric tools such as cordless drills. Some options have been made available for users to utilize chisel bits with cordless drills, such as bit adapters or special chisel bits. These have been designed to convert the torque generated by the cordless drill into a reciprocal linear motion. However, most of these options do not effectively utilize the full torque from the cordless drill. In addition, many of these options can be uncomfortable to use. So, there is a need for a better chisel option that can be used with several electric tools.

An objective of the present invention is to provide a universal chisel attachment for a cordless drill or impact tool. The present invention converts the mechanical rotation of a drill or impact tool to a reciprocating motion to drive a chisel member. Another objective of the present invention is to provide a universal chisel attachment that utilizes a hammering cam mechanism that drives the reciprocal motion of the chisel member using the torque generated by the cordless drill or impact tool. Another objective of the present invention is to provide a universal chisel attachment that is compatible with various accessories to enhance the operation of the present invention. Different interchangeable chisel members can be used with the present invention for different chiseling tasks. Additional features and benefits of the present invention are further discussed in the sections below.

SUMMARY OF THE INVENTION

The present invention provides a universal chisel attachment that enables the user to utilize a chisel member with a cordless drill or impact tool. The present invention is designed to facilitate the use of the chisel member with most electric tools, not just impact tools. The present invention is designed to convert the torque generated by the electric tool into a reciprocal linear motion to drive the chisel member. In the preferred embodiment, the present invention utilizes a hammering cam mechanism that includes cylindrical drum connected to a striking cam. The cylindrical drum is rotated due to the torque generated by the electric tool, which in turn rotates the striking cam. The striking cam is designed to strike the chisel member every time the striking is rotated by the cylindrical drum. When the chisel member is struck by the striking cam, the chisel member is moved in a liner motion towards the surface or object being chiseled. The pressure of the user on the electric tool being used forces the chisel member back to the starting position until the striking cam strikes the chisel member again. Thus, a reciprocating linear motion is generated for the chisel member driven by the torque generated by the electric tool.

DETAILED DESCRIPTION OF THE INVENTION

Figure 1:
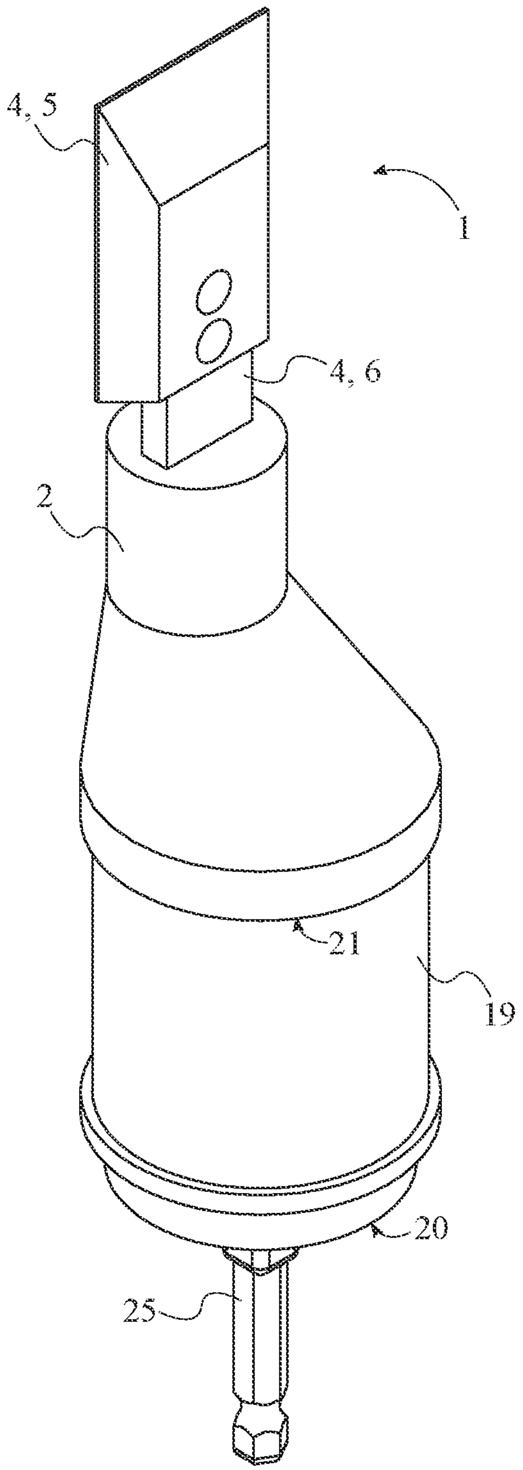
FIG. 1 is a top-front perspective view of the present invention.
Figure 2:
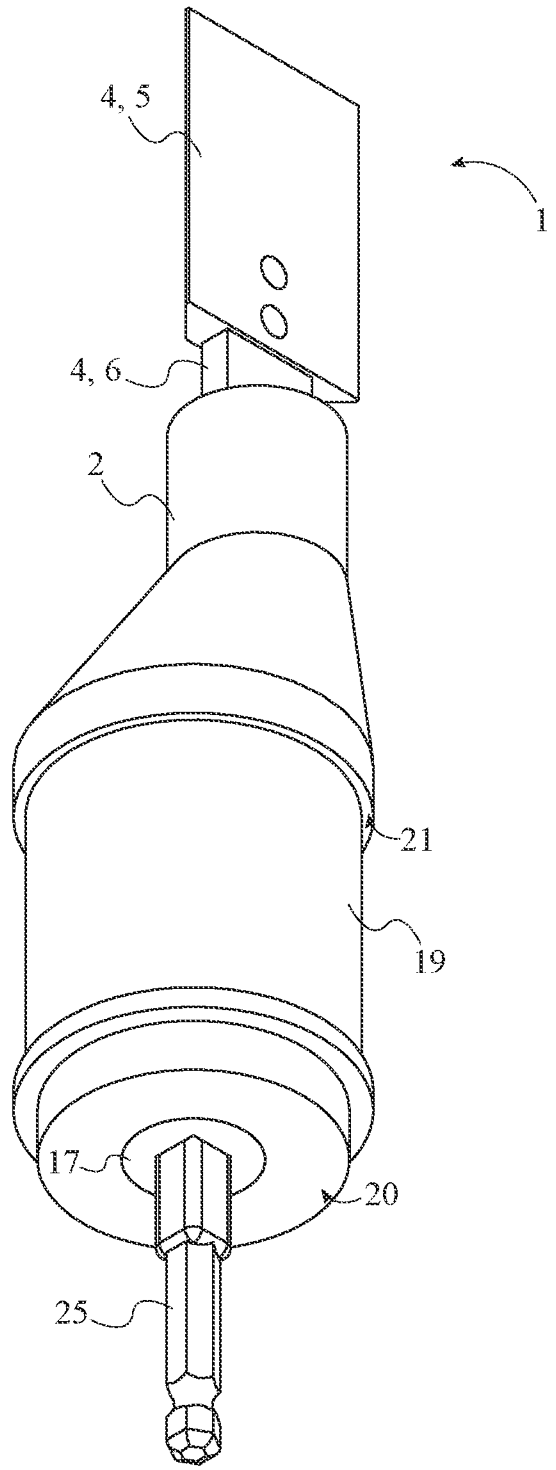
FIG. 2 is a bottom-rear perspective view of the present invention.
Figure 3:
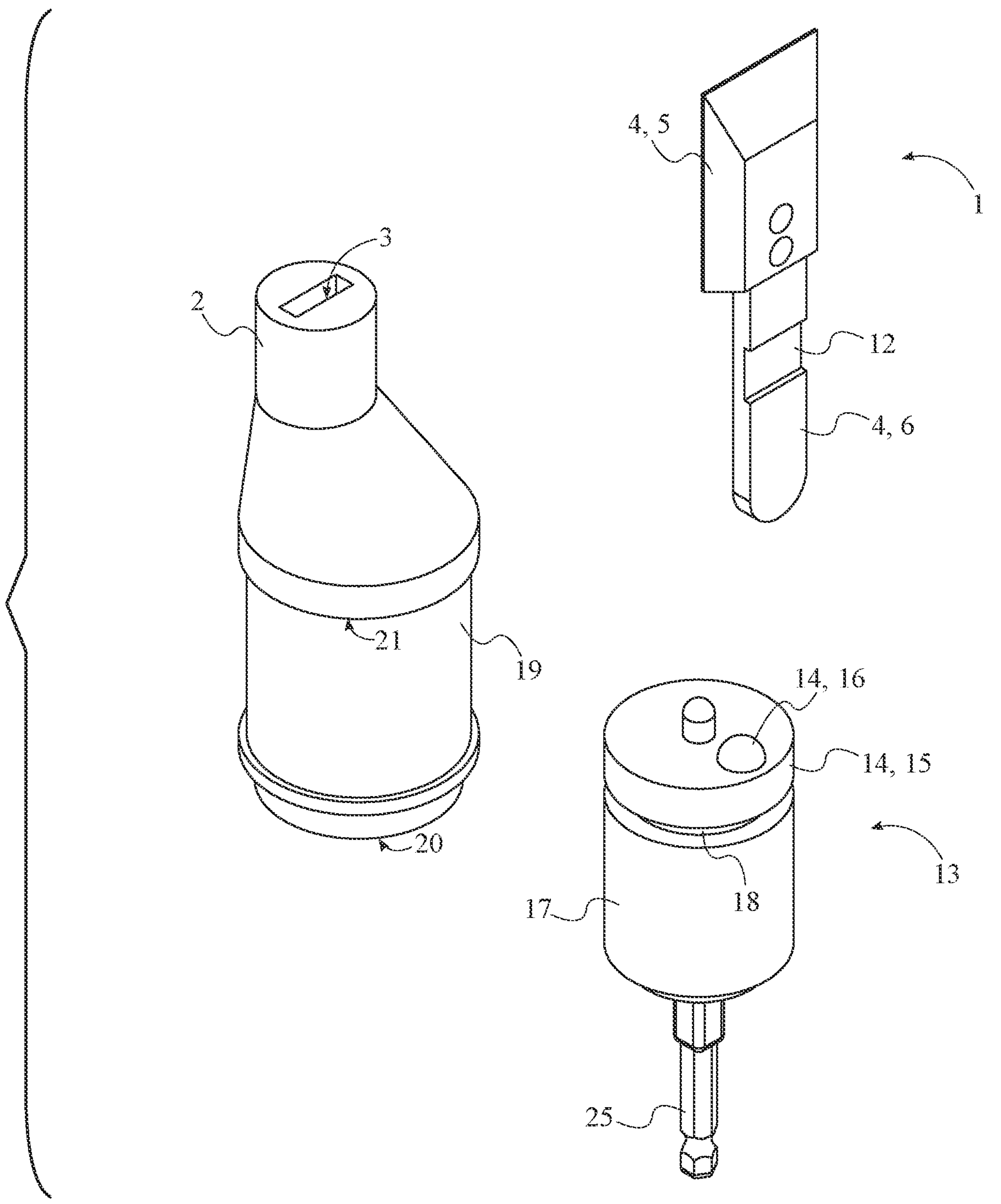
FIG. 3 is a top-front-exploded perspective view of the present invention.
Figure 4:
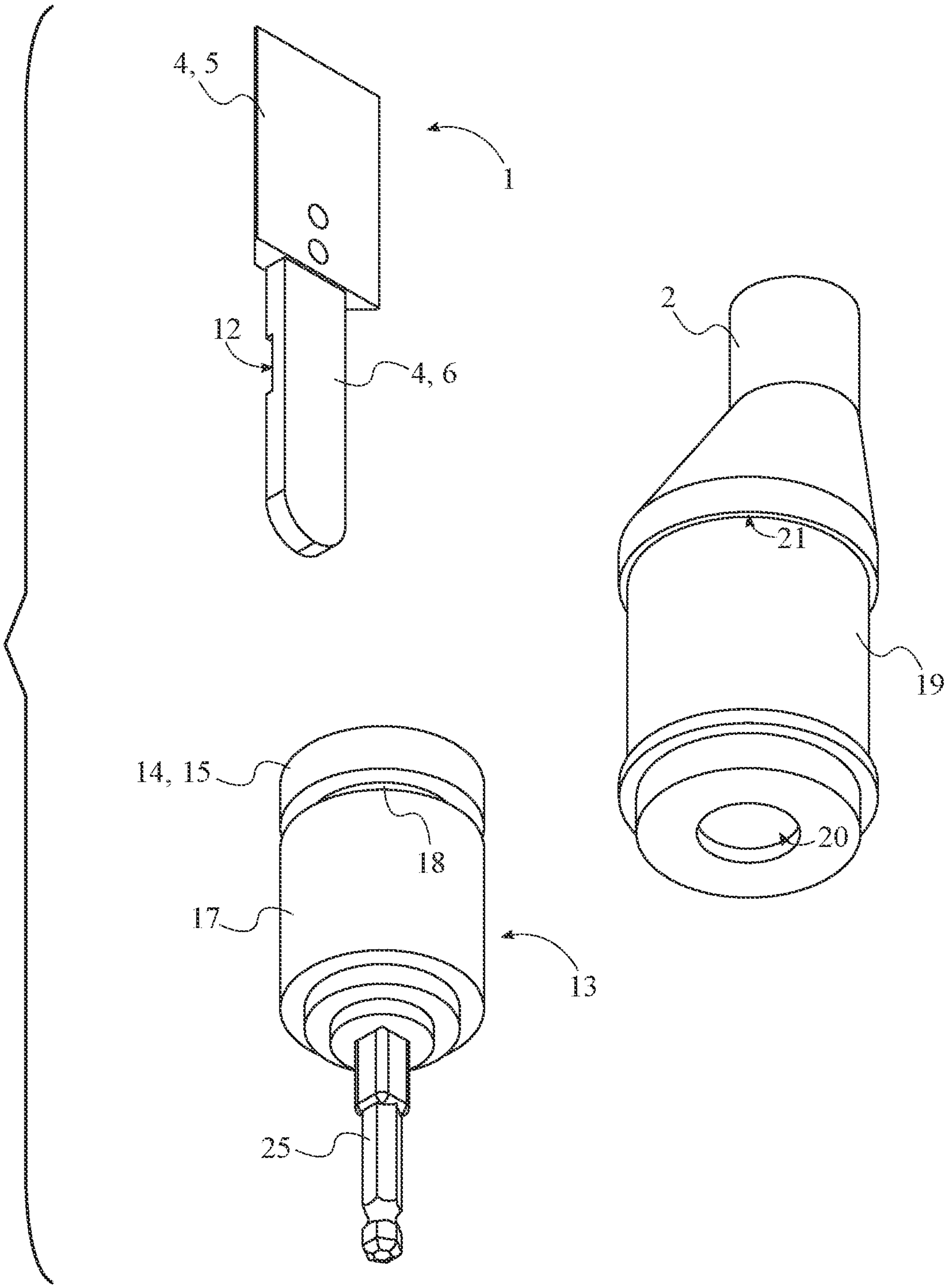
FIG. 4 is a bottom-rear-exploded perspective view of the present invention.
Figure 5:
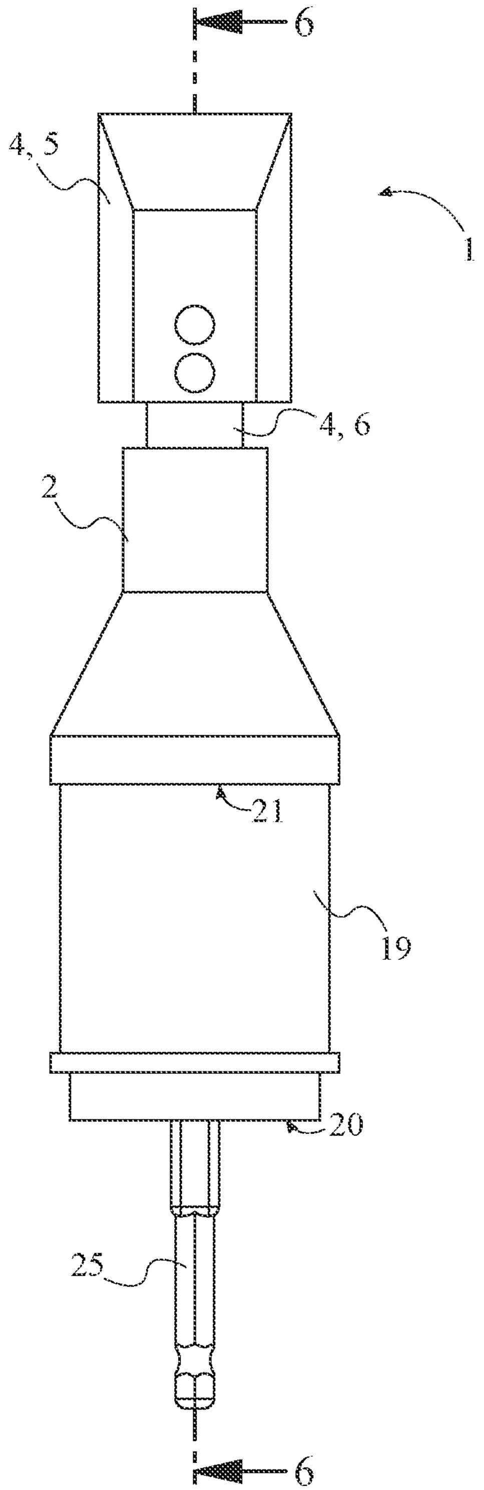
FIG. 5 is a front view of the present invention, wherein a contact protrusion of the striking cam of the present invention is shown rotated away from the chiseling tool.
Figure 6:
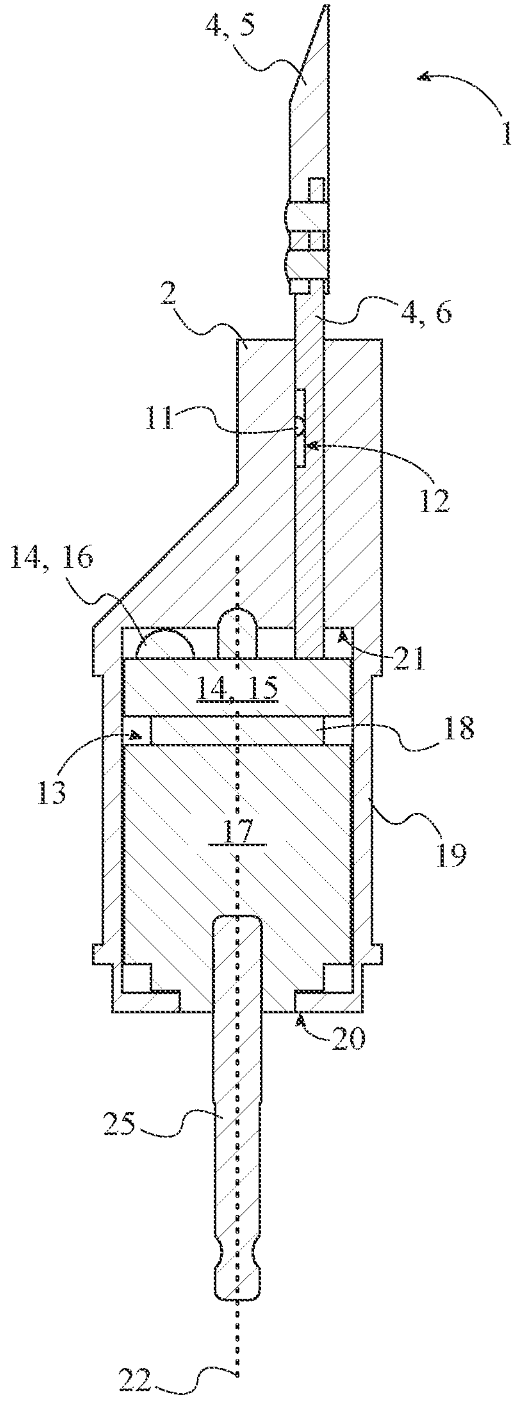
FIG. 6 is a cross-sectional view taken along line 6-6 in FIG. 5.
Figure 7:
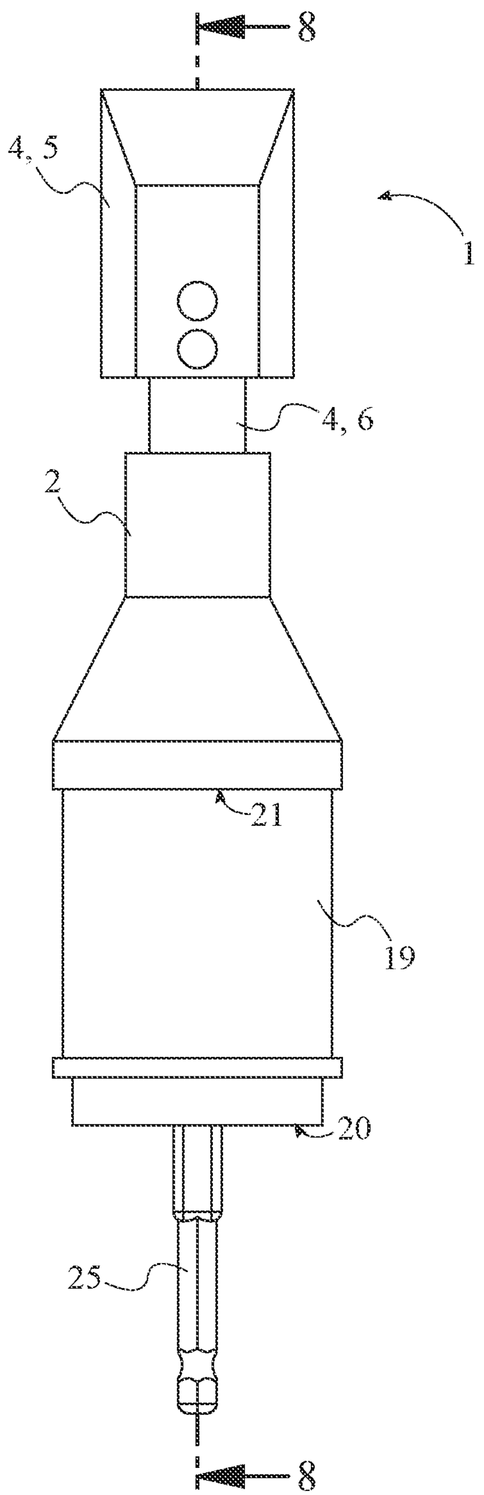
FIG. 7 is a front view of the present invention, wherein a contact protrusion of the striking cam of the present invention is shown striking the chiseling tool.
Figure 8:
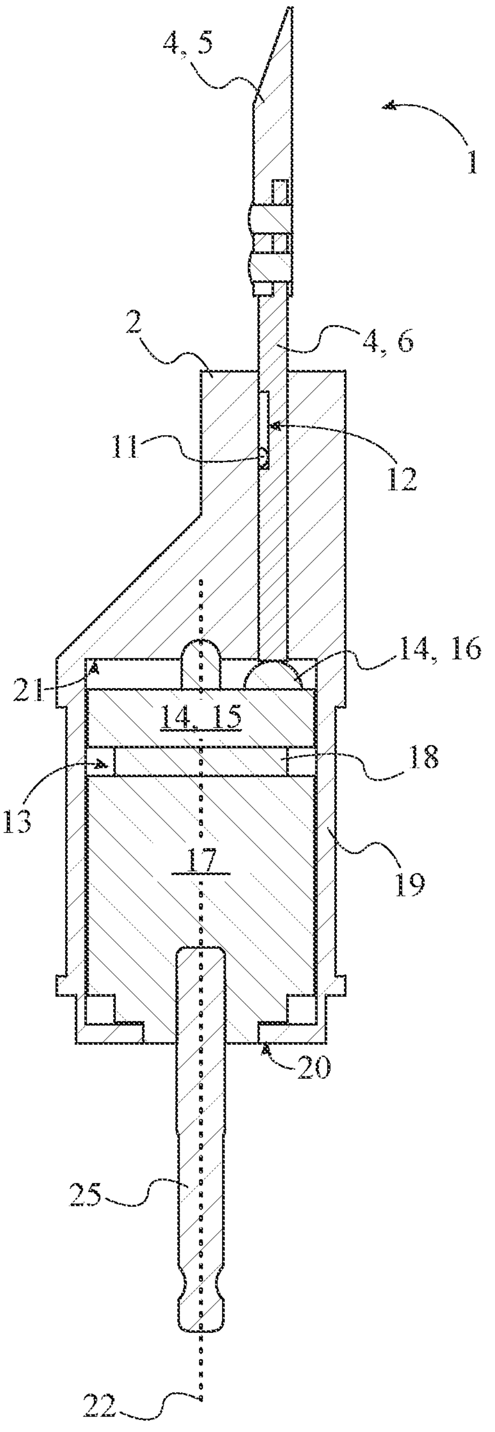
FIG. 8 is a cross-sectional view taken along line 8-8 in FIG. 7.

All illustrations of the drawings are for the purpose of describing selected versions of the present invention and are not intended to limit the scope of the present invention.

The present invention is a universal chisel attachment. The universal chisel attachment is designed to convert the torque generated by an electric tool into a reciprocal linear motion to drive a chisel member. As can be seen in FIGS. 1 through 8, the present invention comprises a socket adapter 25, a chisel assembly 1, a hammering cam mechanism 13, and a tubular housing 19. The socket adapter 25 enables the rotational connection of the hammering cam mechanism 13 to a mounting mechanism of the electric tool. The socket adapter 25 also enables the present invention to be securely mounted to the electric tool. The hammering cam mechanism 13 converts the torque generated by the electric tool to a reciprocal linear motion for the chisel assembly 1. The chisel assembly 1 enables the carving or cutting of the target object with the present invention. The tubular housing 19 enables the unobstructed operation of the hammering cam mechanism 13 while the present invention is in use. The tubular housing 19 also safely retains all the moving components of the hammering cam mechanism 13 to protect the user during operation.

The general configuration of the aforementioned components enables the user to utilize a chisel member with a cordless drill or an impact tool. As can be seen in FIGS. 1 through 8, 13, and 14, the chisel assembly 1 comprises a chisel housing 2, a chisel channel 3, and a chiseling tool 4. The chisel housing 2 is designed to retain the chiseling tool 4 while the chiseling tool 4 is driven by the hammering cam mechanism 13. The chisel channel 3 guides the reciprocal linear motion of the chiseling tool 4. The chiseling tool 4 corresponds to the member that carves or cuts the target object. Further, the hammering cam mechanism 13 comprises a striking cam 14, a cylindrical body 17, and a circular interface 18. The striking cam 14 corresponds to the member that enables the conversion of the rotational movement of the cylindrical body 17 to the reciprocal linear movement of the chiseling tool 4. The cylindrical body 17 enables the rotation of the striking cam 14 from the torque generated by the electric tool. Further, the tubular housing 19 is a hollow structure large enough to restrain the moving components of the hammering cam mechanism 13 during operation. In addition, the tubular housing 19 comprises a first open end 20 and a second open end 21 corresponding to the tubular ends of the tubular housing 19.

In the preferred embodiment, the present invention is assembled as follows. As can be seen in FIGS. 1 through 8, the socket adapter 25, the cylindrical body 17, and the striking cam 14 are axially positioned along a central rotation axis 22 of the tubular housing 19. Due to the shape of the tubular housing 19, the socket adapter 25, the cylindrical body 17, and the striking cam 14 are axially aligned to ensure that the torque generated by the electric tool is efficiently transmitted to the striking cam 14 to rotate the striking cam 14. Accordingly, the cylindrical body 17 is rotatably mounted within the tubular housing 19, adjacent to the first open end 20, so that the cylindrical body 17 is retained by the tubular housing 19 without hindering the rotation of the cylindrical body 17. Further, the socket adapter 25 traverses through the first open end 20 so that the socket adapter 25 can be connected to the cylindrical body 17. In addition, the socket adapter 25 is torsionally mounted to the cylindrical body 17 so that the rotation of the socket adapter 25 driven by the torque of the electric tool also rotates the cylindrical body 17. Further, the striking cam 14 is mounted within the tubular housing 19, adjacent to the second open end 21, so that the striking cam 14 is retained by the tubular housing 19 without hindering the rotation of the striking cam 14. The striking cam 14 is also torsionally mounted to the cylindrical body 17 by the circular interface 18, opposite to the socket adapter 25, so that the rotation of the cylindrical body 17 rotates the striking cam 14. Further, the chisel housing 2 is mounted onto the second open end 21 to secure the chisel housing 2 to the tubular housing 19. In addition, the chisel channel 3 is positioned parallel and offset from the central rotation axis 22 to facilitate the reciprocal linear motion of the chiseling tool 4. The chiseling tool 4 is also slidably mounted through the chisel channel 3 to control the linear movement of the chiseling tool 4. Furthermore, the striking cam 14 is operatively coupled to the chiseling tool 4 to connect the chiseling tool 4 to the striking cam 14. The striking cam 14 is used to convert rotational motion by the socket adapter 25 into a back-and-forth linear motion of the chiseling tool 4. Thus, the present invention enables the user to utilize a chisel member with most electric tools such as a cordless drill or an impact tool.

As can be seen in FIGS. 1 through 12, the striking cam 14 is designed to convert the rotational motion of the cylindrical body 17 to the reciprocal linear motion of the chiseling tool 4 within the tubular housing 19. To do so, the striking cam 14 may comprise a cam disc 15 and at least one contact protrusion 16. The cam disc 15 preferably corresponds to the main structure of the striking cam 14, while the at least one contact protrusion 16 corresponds to the portion of the striking cam 14 that is in contact with the chiseling tool 4. So, in the preferred embodiment, the striking cam 14 is designed as follows. The cam disc 15 is axially positioned along the central rotation axis 22 so that the rotation of the cam disc 15 is axially aligned with the rotation of the cylindrical body 17. Further, the cylindrical body 17 is torsionally connected to the cam disc 15 by the circular interface 18 so that the rotation of the cylindrical body 17 drives the rotation of the cam disc 15. The at least one contact protrusion 16 is connected onto the cam disc 15, opposite to the cylindrical body 17, to secure the at least one contact protrusion 16 to the cam disc 15. In addition, the at least one contact protrusion 16 is positioned offset from the central rotation axis 22 so that the at least one contact protrusion 16 is off-center on the cam disc 15. The at least one contact protrusion 16 is also radially aligned with the chisel channel 3 so that the at least one contact protrusion 16 engages the chiseling tool 4 during every rotation of the cam disc 15. This way, the rotation of the cam disc 15 is driven by torque generated by the electric tool and transferred by the cylindrical body 17. Further, the rotation of the cam disc 15 is converted to linear motion of the chiseling tool 4 by the at least one contact protrusion 16 striking the chiseling tool 4 during every rotation of the cam disc 15. In other embodiments, the striking cam 14 can be designed differently to effectively convert rotational motion to linear motion.

Figure 9:
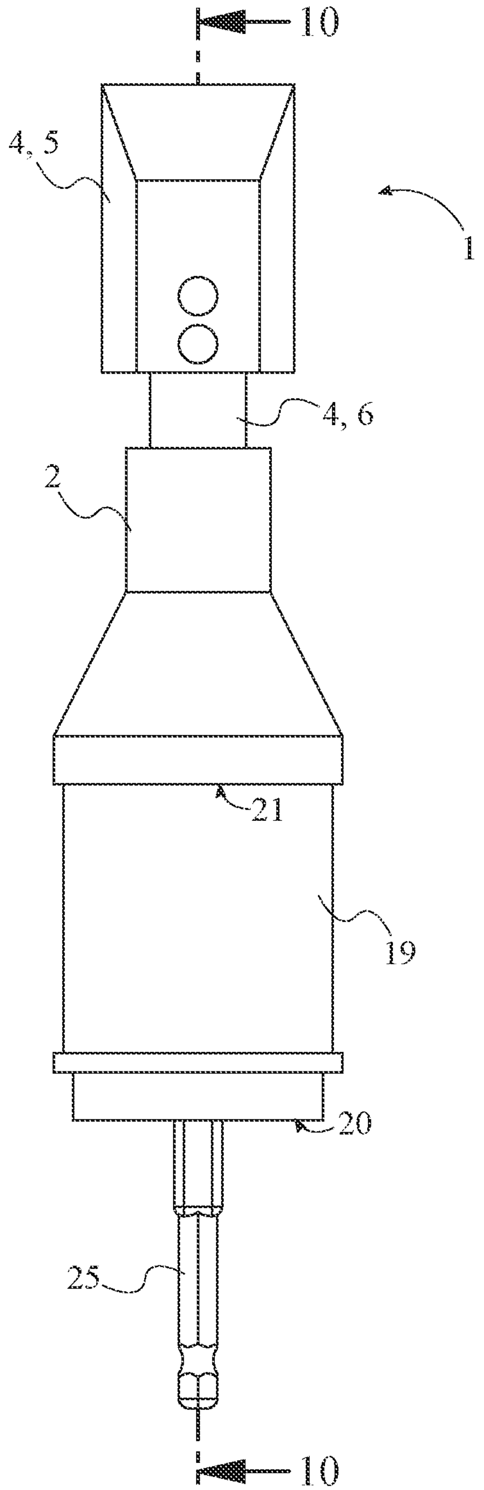
FIG. 9 is a front view of the present invention, wherein the present invention is shown including a bearing mechanism.
Figure 10:
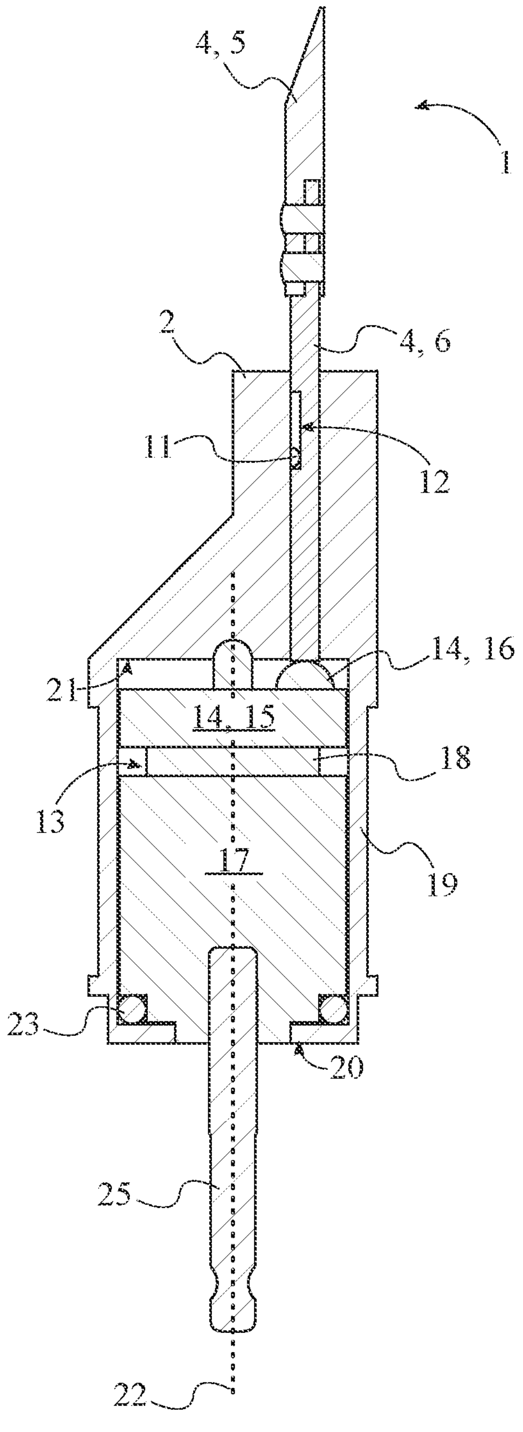
FIG. 10 is a cross-sectional view taken along line 10-10 in FIG. 9.

To ensure that the rotation of the cylindrical body 17 is not affected by friction between the cylindrical body 17 and the inside of the tubular housing 19, the present invention may include means to reduce friction generated by the rotation of the cylindrical body 17 inside the tubular housing 19. In one embodiment, the present invention may further comprise at least one bearing mechanism 23. As can be seen in FIGS. 9 and 10, the at least one bearing mechanism 23 is designed to reduce the friction between the rotating cylindrical body 17 and the interior of the tubular housing 19 without greatly impeding the rotation of the cylindrical body 17. To do so, the cylindrical body 17 is rotatably mounted within the tubular housing 19 by the at least one bearing mechanism 23. For example, the at least one bearing mechanism 23 can be positioned adjacent to the first open end 20 where the torque from electric tool is transmitted to the cylindrical body 17 by the socket adapter 25. In addition, the races of the at least one bearing mechanism 23 can be integrated onto adjacent walls to accommodate the several bearing balls of the at least one bearing mechanism 23. For example, one race of the at least one bearing mechanism 23 can be integrated onto the exterior of the cylindrical body 17 while the other race is integrated onto the interior of the tubular housing 19. The several bearing balls of the at least one bearing mechanism 23 are then positioned in between the races. This way, the rotation of the cylindrical body 17 is not greatly affected by any friction that may result between the rotating cylindrical body 17 and the tubular housing 19.

Figure 11:
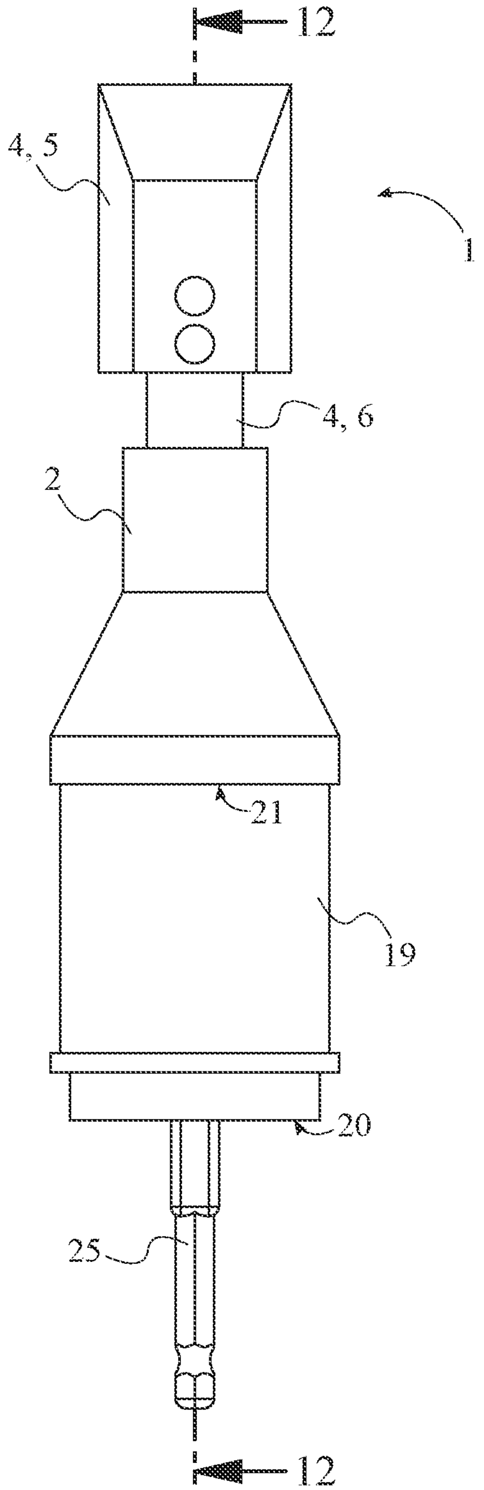
FIG. 11 is a front view of the present invention, wherein the present invention is shown including several bearing mechanisms.
Figure 12:
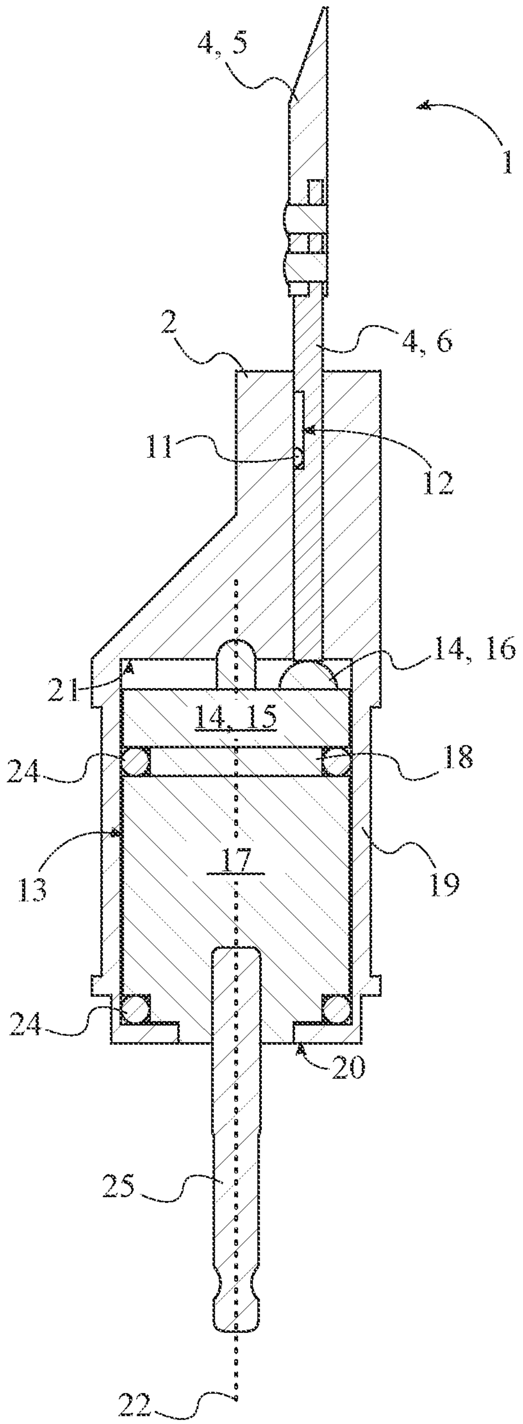
FIG. 12 is a cross-sectional view taken along line 12-12 in FIG. 11.
Figure 13:
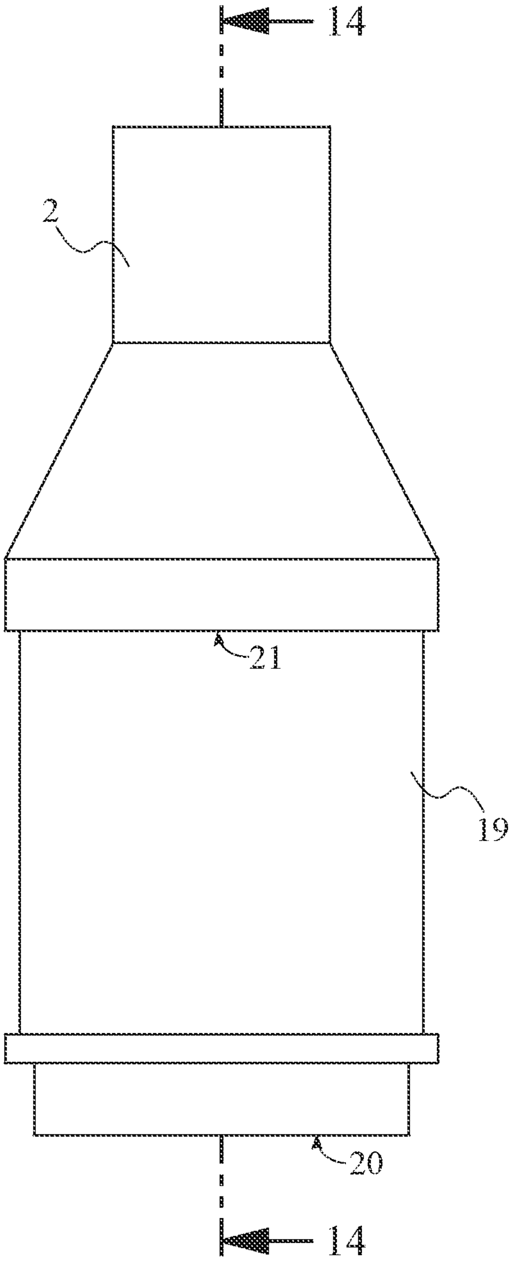
FIG. 13 is a front view of the tubular housing of the present invention.
Figure 14:
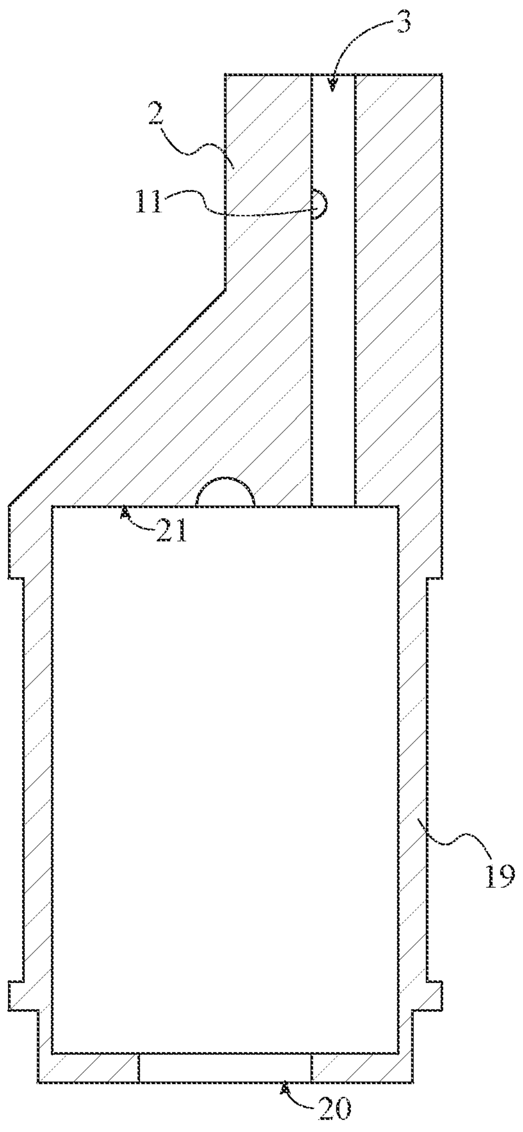
FIG. 14 is a cross-sectional view taken along line 14-14 in FIG. 13.

To further reduce the friction between the rotating cylindrical body 17 and the tubular housing 19, several bearing mechanisms can be utilized. As can be seen in FIGS. 11 and 12, the at least one bearing mechanism 23 may be a plurality of bearing mechanisms 24. Further, the plurality of bearing mechanisms 24 is distributed along the cylindrical body 17 so that the several bearing mechanisms are evenly distributed inside the tubular housing 19 without obstructing the rotation of the cylindrical body 17. For example, two bearing mechanisms can be included, one adjacent to the first open end 20 and the other one adjacent to the striking cam 14. As a result, the rotation of the cylindrical body 17 is not greatly affected by the friction between the rotating cylindrical body 17 and the tubular housing 19. Additional bearing mechanisms also help maintain the rotation of the cylindrical body 17 aligned with the central rotation axis 22 to increase the efficiency of the hammering cam mechanism 13. In other embodiments, different mechanisms can be utilized to reduce the friction between the rotating cylindrical body 17 and the tubular housing 19.

As previously discussed, the present invention is designed to be securely connected to the electric tool using the socket adapter 25. The socket adapter 25 is designed to be utilized with the most common mounting mechanisms of electric tools, such as a keyed or keyless chuck of a cordless drill or an impact tool. Different designs of the socket adapter 25 can be utilized in the present invention. In one embodiment, the socket adapter 25 and the cylindrical body 17 are preferably a single contiguous piece of rigid material, as can be seen in FIGS. 1 through 12. In other words, the socket adapter 25 is fixed to the cylindrical body 17. This ensures that there is little risk of the cylindrical body 17 disconnecting from the socket adapter 25 when the present invention is coupled to the electric tool by the socket adapter 25.

Furthermore, the present invention enables the reciprocal linear motion of the chiseling tool 4 to enable the user to perform the desired chiseling task. As can be seen in FIGS. 5 through 14, the chisel assembly 1 may further comprise a guide stop 11 and a guide slot 12. The guide stop 11 and the guide slot 12 are designed to enable the reciprocal linear motion of the chiseling tool 4 without risking the chiseling tool 4 decoupling from the chisel housing 2. Accordingly, the guide stop 11 is connected within the chisel channel 3 to secure the guide stop 11 to the interior of the chisel channel 3. Further, the guide slot 12 laterally traverses into the chiseling tool 4, so a recess is formed along the chiseling tool 4. The size of the guide slot 12 is large enough to enable the chiseling tool 4 to move in a reciprocal linear motion. Then, to secure the chiseling tool 4 to the chisel housing 2, the guide slot 12 is positioned along the chiseling tool 4. The guide stop 11 is then slidably engaged into the guide slot 12. This way, as the rotating striking cam 14 drives the linear motion of the chiseling tool 4, the chiseling tool 4 slidably moves along the guide slot 12 until the guide stop 11 hits the end of the guide slot 12. Then, due to the user pressing the present invention against the target object being carved or cut, the chiseling tool 4 is forced back into chisel housing 2 until the chiseling tool 4 is in contact with the striking cam 14. As a result, the reciprocal linear motion is generated from the rotational motion of the striking cam 14. In other embodiments, different guiding mechanisms can be utilized to facilitate the generation of the reciprocal linear motion of the chiseling tool 4.

Figure 15:
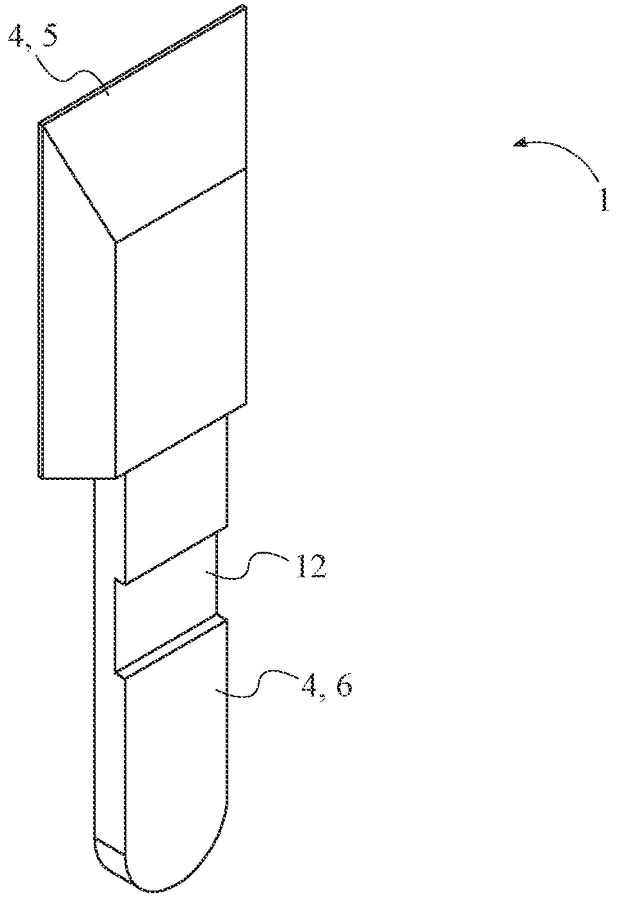
FIG. 15 is a top-front perspective view of a chiseling tool of the present invention, wherein the tool head and the tool shaft of the chiseling tool are shown as a single rigid piece.
Figure 16:
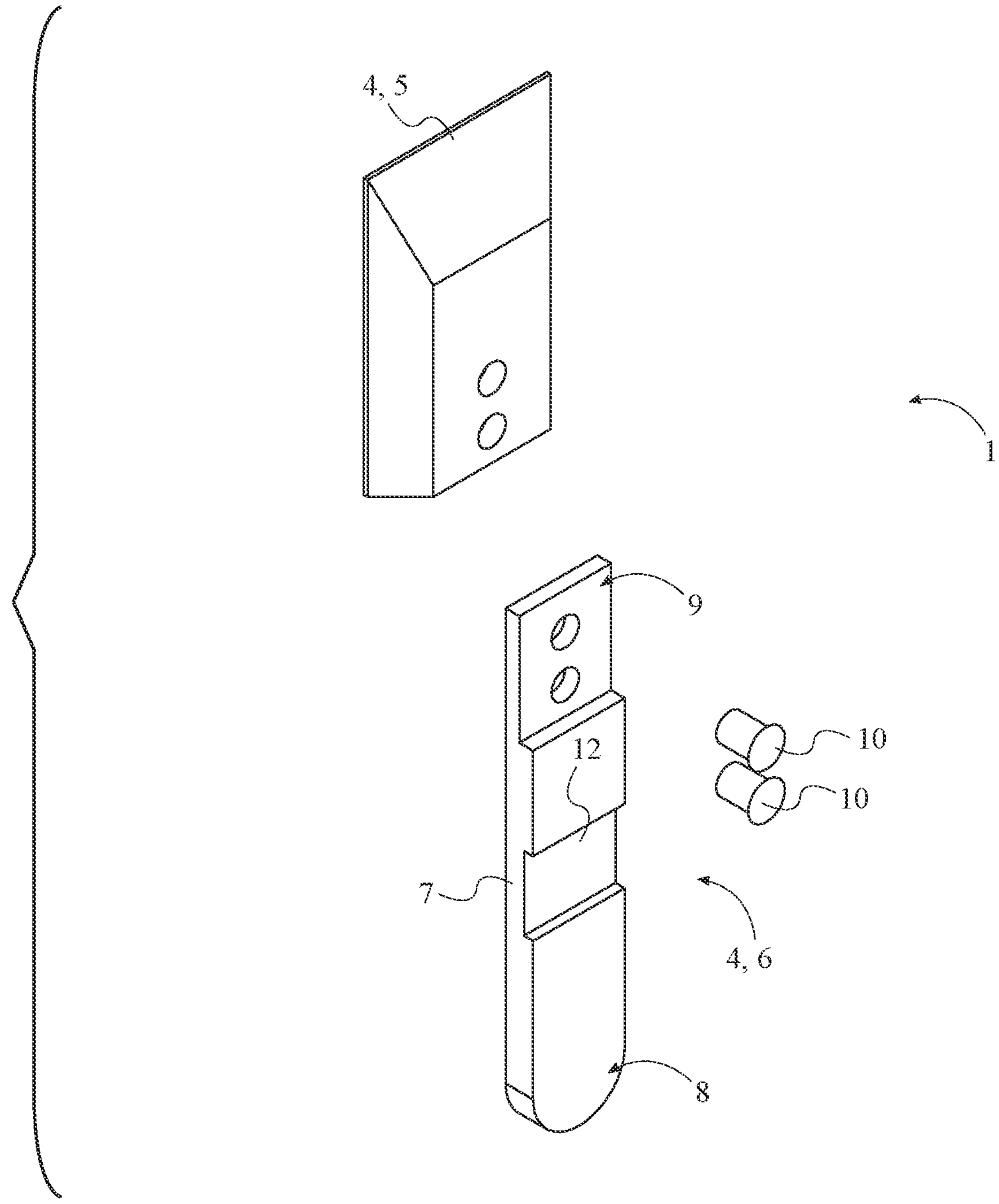
FIG. 16 is a top-front-exploded perspective view of the chiseling tool of the present invention, wherein the tool head and the tool shaft of the chiseling tool are shown as separate pieces.
Figure 17:
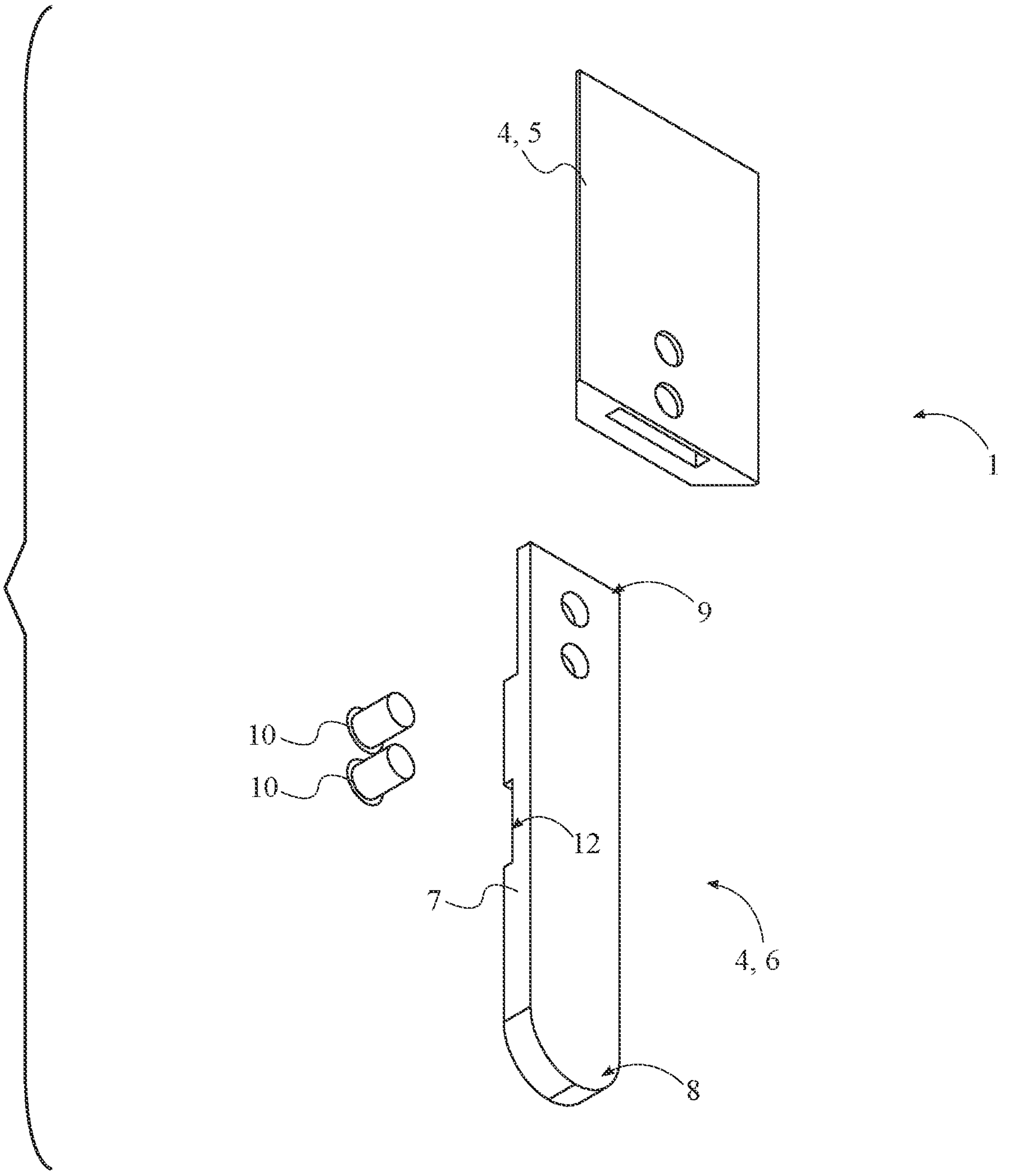
FIG. 17 is a bottom-rear-exploded perspective view of the chiseling tool of the present invention.
Figure 18:
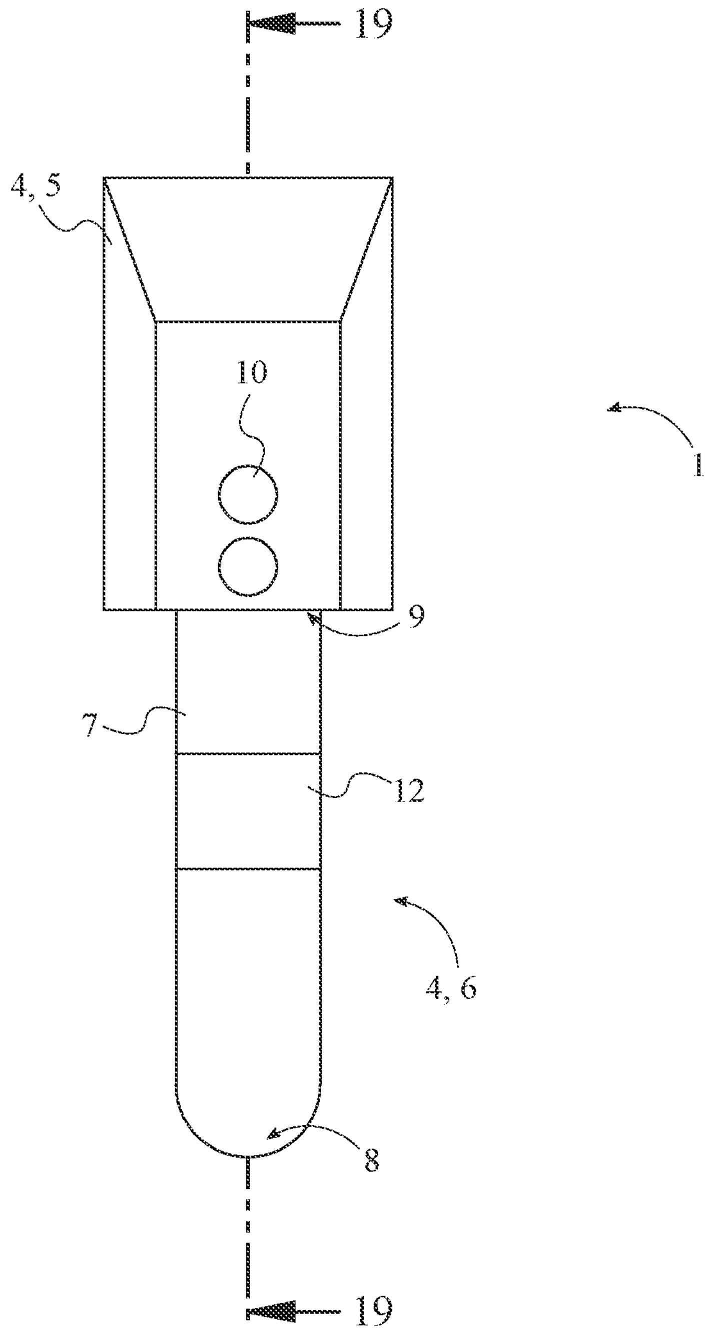
FIG. 18 is a front view of the chiseling tool of the present invention.
Figure 19:
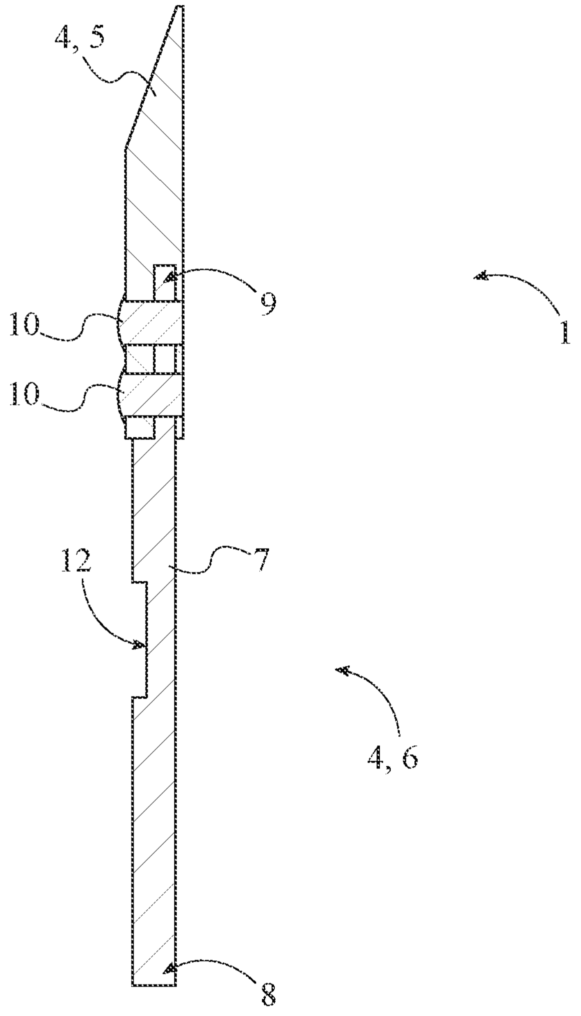
FIG. 19 is a cross-sectional view taken along line 19-19 in FIG. 18.

As can be seen in FIGS. 15 through 19, the chiseling tool 4 may comprise a tool head 5 and a tool shaft 6. The tool head 5 preferably corresponds to the portion of the chiseling tool 4 that is used to carve or cut the target object. The tool shaft 6 corresponds to the portion of the chiseling tool 4 that secures the chiseling tool 4 to the chisel housing 2. Accordingly, the striking cam 14 is terminally positioned to the tool shaft 6 so that the tool shaft 6 is in contact with the tool shaft 6. Further, the tool head 5 is terminally mounted to the tool shaft 6, opposite the striking cam 14 to secure the tool head 5 to the tool shaft 6. Thus, as the striking cam 14 engages with the tool shaft 6, the tool head 5 is moved in a reciprocal linear motion by the tool shaft 6. In some embodiments, the tool head 5 and the tool shaft 6 can be a single contiguous piece of material, as can be seen in FIG. 15. A single structure for the chiseling tool 4 can provide greater structural strength for the various chiseling tasks. However, if the user wants to use a different chisel member, the user must replace the whole chiseling tool 4. In other embodiments, the chiseling tool 4 can be provided as a modular structure that enables the user to replace just the tool head 5 to perform different chiseling tasks.

As can be seen in FIGS. 16 through 19, in the modular embodiment of the chiseling tool 4, the chiseling tool 4 may further comprise at least one tool fastener 10 that enables the removable attachment of the tool head 5 to the tool shaft 6. In addition, the tool shaft 6 may comprise a shaft body 7, a cam-engagement end 8, and a head-engagement end 9. The shaft body 7 preferably corresponds to the main structure of the tool shaft 6. The cam-engagement end 8 corresponds to the portion of the shaft body 7 that engages the striking cam 14, while the head-engagement end 9 corresponds to the portion of the shaft body 7 that engages the tool head 5. So, the cam-engagement end 8 and the head-engagement end 9 are positioned opposite to each other along the shaft body 7 due to the elongated shape of the shaft body 7. Further, the tool head 5 and the head-engagement end 9 are externally positioned with the chisel housing 2 so that the tool head 5 can be attached to the head-engagement end 9. On the other hand, the cam-engagement end 8 is positioned within the tubular housing 19 to enable the cam-engagement end 8 to engage with the striking cam 14. Then, to secure the tool head 5 to the shaft body 7, the head-engagement end 9 is attached onto the tool head 5 by the at least one tool fastener 10. This way, the user can replace the tool head 5 with a different tool head 5 that meets the user's needs.

In some embodiments, the present invention may further include means for the user to safely handle the present invention while carving or cutting the target object. The present invention may further include a handle, a clamp, and a handle-receiving groove. The handle enables the user to better control and maneuver the present invention while engaged with an electric tool. The clamp allows the handle to be removably attached around the tubular housing 19. The handle-receiving groove keeps the position of the clamp, and consequently the position of the handle, fixed along the tubular housing 19. The handle-receiving groove is laterally integrated onto the tubular housing 19 so that the position of the clamp always remains stationary along the tubular housing 19. The handle is fixed with the clamp and is positioned perpendicular to the tubular housing 19 so that the present invention is easily grasped by the user with the handle. The clamp is engaged around the handle-receiving groove to fasten the handle with the tubular housing 19. In other embodiments, different accessories can be provided to enhance the operation of the present invention.

Although the invention has been explained in relation to its preferred embodiment, it is to be understood that many other possible modifications and variations can be made without departing from the spirit and scope of the invention as hereinafter claimed.

What is claimed is:

1. A universal chisel attachment comprising:
a socket adapter;
a chisel assembly;
a hammering cam mechanism;
a tubular housing;
the chisel assembly comprising a chisel housing, a chisel channel, and a chiseling tool;
the hammering cam mechanism comprising a striking cam, a cylindrical body, and a circular interface;
the tubular housing comprising a first open end and a second open end;
the striking cam comprising a cam disc and at least one contact protrusion;
the socket adapter, the cylindrical body, and the striking cam being axially positioned along a central rotation axis of the tubular housing;
the cylindrical body being rotatably mounted within the tubular housing, adjacent to the first open end;
the socket adapter traversing through the first open end;
the socket adapter being torsionally mounted to the cylindrical body;
the striking cam being mounted within the tubular housing, adjacent to the second open end;
the cam disc being axially positioned along the central rotation axis;
the cylindrical body being torsionally connected to the cam disc by the circular interface, opposite to the socket adapter;
the at least one contact protrusion being a dome-shaped nub;
the at least one contact protrusion being connected onto the cam disc, opposite to the cylindrical body;
the at least one contact protrusion being positioned offset from the central rotation axis;
the at least one contact protrusion being radially aligned with the chisel channel;
the chisel housing being mounted onto the second open end;
the chisel channel being positioned parallel and offset from the central rotation axis;
the chiseling tool being slidably mounted through the chisel channel; and
the at least one contact protrusion being configured to periodically strike the chiseling tool but is otherwise not in physical contact with the chiseling tool as the cam disc is rotated by the cylindrical body, wherein the cylindrical body is rotated by the socket adapter.

2. The universal chisel attachment as claimed in claim 1 comprising:
a distal bearing mechanism;
a base radius of the cylindrical body being equal to a lumen radius of the tubular housing;
a disc radius of the cam disc being equal to the base radius of the cylindrical body;
an interface radius of the circular interface being less than the base radius of the cylindrical body;
a lateral thickness of the cylindrical body being at least three times larger than a lateral thickness of the cam disc;
the dome-shaped nub comprising a convex portion and a flat portion;
the dome-shaped nub being peripherally positioned on the cam disc;
the flat portion being connected onto the cam disc;
the convex portion being oriented away from the cam disc;
the cylindrical body, the circular interface, and the cam disc being rotatably mounted within the tubular housing by the distal bearing mechanism; and
the distal bearing mechanism being positioned within an annular space delineated between the cylindrical body, the circular interface, and the cam disc.

3. The universal chisel attachment as claimed in claim 1 comprising:
a proximal bearing mechanism;
the cylindrical body being rotatably mounted within the tubular housing by the proximal bearing mechanism; and
the proximal bearing mechanism being positioned between the cylindrical body and the first open end.

4. The universal chisel attachment as claimed in claim 3 comprising:
the at least one bearing mechanism being a plurality of bearing mechanisms; and
the plurality of bearing mechanisms being distributed along the cylindrical body.

5. The universal chisel attachment as claimed in claim 1, the socket adapter and the cylindrical body are a single contiguous piece of rigid material.

6. The universal chisel attachment as claimed in claim 1 comprising:
the chisel assembly further comprising a guide stop and a guide slot;
the guide stop being connected within the chisel channel;
the guide slot laterally traversing into the chiseling tool;
the guide slot being positioned along the chiseling tool; and
the guide stop being slidably engaged into the guide slot.

7. The universal chisel attachment as claimed in claim 1 comprising:
the chiseling tool comprising a tool head and a tool shaft;
the striking cam being terminally positioned to the tool shaft; and
the tool head being terminally mounted to the tool shaft, opposite the striking cam.

8. The universal chisel attachment as claimed in claim 7, wherein the tool head and the tool shaft are a single contiguous piece of material.

9. The universal chisel attachment as claimed in claim 7 comprising:
the chiseling tool further comprising at least one tool fastener;
the tool shaft comprising a shaft body, a cam-engagement end, and a head-engagement end;
the cam-engagement end and the head-engagement end being positioned opposite to each other along the shaft body;
the tool head and the head-engagement end being externally positioned with the chisel housing;
the cam-engagement end being positioned within the tubular housing; and the head-engagement end being attached onto the tool head by the at least one tool fastener.

10. A universal chisel attachment comprising:

a socket adapter;

a chisel assembly;

a hammering cam mechanism;

a tubular housing;

a proximal bearing mechanism;

the chisel assembly comprising a chisel housing, a chisel channel, and a chiseling tool;

the hammering cam mechanism comprising a striking cam, a cylindrical body, and a circular interface;

the tubular housing comprising a first open end and a second open end;

the chiseling tool comprising a tool head and a tool shaft;

the striking cam comprising a cam disc and at least one contact protrusion;

the socket adapter and the cylindrical body being a single contiguous piece of rigid material;

the socket adapter, the cylindrical body, and the striking cam being axially positioned along a central rotation axis of the tubular housing;

the cylindrical body being rotatably mounted within the tubular housing, adjacent to the first open end;

the socket adapter traversing through the first open end;

the socket adapter being torsionally mounted to the cylindrical body;

the striking cam being mounted within the tubular housing, adjacent to the second open end;

the cam disc being axially positioned along the central rotation axis;

the cylindrical body being torsionally connected to the cam disc by the circular interface, opposite to the socket adapter;

the at least one contact protrusion being a dome-shaped nub;

the at least one contact protrusion being connected onto the cam disc, opposite to the cylindrical body;

the at least one contact protrusion being positioned offset from the central rotation axis;

the at least one contact protrusion being radially aligned with the chisel channel;

the chisel housing being mounted onto the second open end;

the chisel channel being positioned parallel and offset from the central rotation axis;

the chiseling tool being slidably mounted through the chisel channel;

the cylindrical body being rotatably mounted within the tubular housing by the proximal bearing mechanism;

the proximal bearing mechanism being positioned between the cylindrical body and the first open end;

the striking cam being terminally positioned to the tool shaft;

the tool head being terminally mounted to the tool shaft, opposite the striking cam; and the at least one contact protrusion being configured to periodically strike the chiseling tool but is otherwise not in physical contact with the chiseling tool as the cam disc is rotated by the cylindrical body, wherein the cylindrical body is rotated by the socket adapter.

11. The universal chisel attachment as claimed in claim 10 comprising:

a distal bearing mechanism;

a base radius of the cylindrical body being equal to a lumen radius of the tubular housing;

a disc radius of the cam disc being equal to the base radius of the cylindrical body;

an interface radius of the circular interface being less than the base radius of the cylindrical body;

a lateral thickness of the cylindrical body being at least three times larger than a lateral thickness of the cam disc;

the dome-shaped nub comprising a convex portion and a flat portion;

the dome-shaped nub being peripherally positioned on the cam disc;

the flat portion being connected onto the cam disc;

the convex portion being oriented away from the cam disc;

the cylindrical body, the circular interface, and the cam disc being rotatably mounted within the tubular housing by the distal bearing mechanism; and the distal bearing mechanism being positioned within an annular space delineated between the cylindrical body, the circular interface, and the cam disc.

12. The universal chisel attachment as claimed in claim 10 comprising:

the chisel assembly further comprising a guide stop and a guide slot;

the guide stop being connected within the chisel channel;

the guide slot laterally traversing into the chiseling tool;

the guide slot being positioned along the chiseling tool; and the guide stop being slidably engaged into the guide slot.

13. The universal chisel attachment as claimed in claim 10, wherein the tool head and the tool shaft are a single contiguous piece of material.

14. The universal chisel attachment as claimed in claim 10 comprising:

the chiseling tool further comprising at least one tool fastener;

the tool shaft comprising a shaft body, a cam-engagement end, and a head-engagement end;

the cam-engagement end and the head-engagement end being positioned opposite to each other along the shaft body;

the tool head and the head-engagement end being externally positioned with the chisel housing;

the cam-engagement end being positioned within the tubular housing; and the head-engagement end being attached onto the tool head by the at least one tool fastener.

15. A universal chisel attachment comprising:

a socket adapter;

a chisel assembly;

a hammering cam mechanism;

a tubular housing;

a proximal bearing mechanism;

a distal bearing mechanism;

the chisel assembly comprising a chisel housing, a chisel channel, and a chiseling tool;

the hammering cam mechanism comprising a striking cam, a cylindrical body, and a circular interface;

the tubular housing comprising a first open end and a second open end;

the chiseling tool comprising a tool head and a tool shaft;

the striking cam comprising a cam disc and at least one contact protrusion;

the socket adapter and the cylindrical body being a single contiguous piece of rigid material;

the socket adapter, the cylindrical body, and the striking cam being axially positioned along a central rotation axis of the tubular housing;

the cylindrical body being rotatably mounted within the tubular housing, adjacent to the first open end;

the socket adapter traversing through the first open end;

the socket adapter being torsionally mounted to the cylindrical body;

the striking cam being mounted within the tubular housing, adjacent to the second open end;

the striking cam being torsionally mounted to the cylindrical body by the circular interface, opposite to the socket adapter;

the chisel housing being mounted onto the second open end;

the chisel channel being positioned parallel and offset from the central rotation axis;

the chiseling tool being slidably mounted through the chisel channel;

the at least one contact protrusion being configured to periodically strike the chiseling tool but is otherwise not in physical contact with the chiseling tool as the cam disc is rotated by the cylindrical body, wherein the cylindrical body is rotated by the socket adapter;

the cylindrical body being rotatably mounted within the tubular housing by the proximal bearing mechanism;

the proximal bearing mechanism being positioned between the cylindrical body and the first open end;

the striking cam being terminally positioned to the tool shaft;

the tool head being terminally mounted to the tool shaft, opposite the striking cam;

a base radius of the cylindrical body being equal to a lumen radius of the tubular housing;

a disc radius of the cam disc being equal to the base radius of the cylindrical body;

an interface radius of the circular interface being less than the base radius of the cylindrical body;

a lateral thickness of the cylindrical body being at least three times larger than a lateral thickness of the cam disc;

the at least one contact protrusion being a dome-shaped nub;

the dome-shaped nub comprising a convex portion and a flat portion;

the cam disc being axially positioned along the central rotation axis;

the cylindrical body being torsionally connected to the cam disc by the circular interface, opposite to the socket adapter;

the at least one contact protrusion being connected onto the cam disc, opposite to the cylindrical body;

the at least one contact protrusion being positioned offset from the central rotation axis;

the at least one contact protrusion being radially aligned with the chisel channel;

the dome-shaped nub being peripherally positioned on the cam disc;

the flat portion being connected onto the cam disc;

the convex portion being oriented away from the cam disc;

the cylindrical body, the circular interface, and the cam disc being rotatably mounted within the tubular housing by the distal bearing mechanism; and the distal bearing mechanism being positioned within an annular space delineated between the cylindrical body, the circular interface, and the cam disc.

16. The universal chisel attachment as claimed in claim 15 comprising:

the chisel assembly further comprising a guide stop and a guide slot;

the guide stop being connected within the chisel channel;

the guide slot laterally traversing into the chiseling tool;

the guide slot being positioned along the chiseling tool; and the guide stop being slidably engaged into the guide slot.

17. The universal chisel attachment as claimed in claim 15, wherein the tool head and the tool shaft are a single contiguous piece of material.

18. The universal chisel attachment as claimed in claim 15 comprising:

the chiseling tool further comprising at least one tool fastener;

the tool shaft comprising a shaft body, a cam-engagement end, and a head-engagement end;

the cam-engagement end and the head-engagement end being positioned opposite to each other along the shaft body;

the tool head and the head-engagement end being externally positioned with the chisel housing;

the cam-engagement end being positioned within the tubular housing; and the head-engagement end being attached onto the tool head by the at least one tool fastener.

* * * * *